United States Patent Office 2,755,255
Patented July 17, 1956

2,755,255

ELECTROLUMINESCENT ZINC SULFIDE PHOSPHOR

Carolee Crawford Beutler, Milwaukee, Wis., and Jerome S. Prener, Schenectady, N. Y., assignors to General Electric Company, a corporation of New York No Drawing. Application January 30, 1953, Serial No. 334,354

4 Claims. (Cl. 252—301.6)

This invention relates generally to luminescent materials or phosphors, and more particularly to copper-activated zinc sulfide phosphors suitable for use in an electroluminescent cell.

It is an object of this invention to provide a copper-activated zinc sulfide phosphor which emits blue or green radiation depending on the copper concentration under excitation by an alternating current field.

Briefly stated, in accordance with one of its aspects, this invention is directed to a copper-activated zinc sulfide phosphor having a blue to green electroluminescent emission prepared by firing zinc sulfide in admixture with about 0.05% to 1% by weight of copper at a temperature of approximately 1100° C. in an inert atmosphere.

In preparing a phosphor in accordance with this invention, a solution of copper nitrate and sodium chloride is added to finely divided zinc sulfide, the copper nitrate being present to the extent of about 0.3% weight of copper based on the weight of the zinc sulfide, and sodium chloride being present to the extent of about 5% by weight of the sulfide. After drying and thorough mixing the material is fired at about 1100° C. in a nitrogen atmosphere for about one-half hour. The mixture is then cooled and washed with boiling water to remove the sodium chloride which has served as a flux. Excess copper is then removed by washing with a potassium cyanide solution.

After washing with the potassium cyanide solution, the mixture is given a water wash, dried, and run through a screen of 200 mesh. The material is now ready for incorporation in an electroluminescent cell or as a phosphor coat to be subjected to ultraviolet radiation.

The above described preparation may be changed in many of its details without harm to the final product. Thus, the copper activator may be introduced as a salt other than the nitrate and in quantities other than 0.3%, by weight. For example, copper sulphate or copper sulfide may be substituted for copper nitrate. The principal requirement is that the copper salt have a low enough volatility at the firing temperature to avoid being separated from the remainder of the mix. Copper salts which fulfill this requirement are satisfactory in this invention. Satisfactory emission characteristics have been obtained within a copper content range of .05% to 1%, by weight, of the zinc sulfide in the original mix.

Alkali bromides and chlorides generally are satisfactory flux materials. Potassium chloride is an inexpensive flux which may be substituted for sodium chloride. There is no critical flux content to be used in the mixture. Where flux is present in the initial mix to an extent of less than 5% its fluxing action is reduced to a proportional degree. The presence of more than 5%, by weight, of flux generally serves no useful purpose but does no harm since the flux is removed after the firing steps. A good product has been produced by firing at 1100° C. for one-half hour. However, the firing may be carried on at 1000° C. provided the time of firing is extended beyond one-half hour. Firing at temperatures above 1100° C. does no harm provided the temperature is not so high that volatile components can separate readily from the mixture. We have found a temperature range of 1000° C. to 1200° C. to be entirely satisfactory. Satisfactory phosphors may also be prepared by firing at temperatures below 1000° C. and above 1200° C. but the efficiency of the process decreases to an undesirable degree at these lower and higher ranges. If the time of treatment is extended beyond one-half hour, the final phosphor is not harmed but neither it is improved sufficiently to warrant an extended treatment.

Cyanide solutions generally are satisfactory for removing excess copper from the phosphor. Sodium cyanide is just as satisfactory for this purpose as potassium cyanide. After the cyanide wash copper activator is present to an extent of the order of 0.01% to 0.1% by weight of zinc sulfide. The most desirable phosphors are produced from an initial copper content of 0.3%.

When the phosphors of this invention are incorporated in an electroluminescent cell as a suspension in a clear dielectric such as a transparent plastic, the phosphor emits blue or green light depending on copper concentration which increases in brightness with the applied voltage and frequency. Maximum emission is at about 5100 Angstroms for the green emitting phosphors and emission in the red and blue range is at a lower level. The phosphor will also emit green light when subjected to excitation by ultraviolet rays of a wave length of about 3650 Angstroms.

The phosphors of this invention will emit green light only if the step of firing is carried out in an inert atmosphere. Nitrogen or the inert gases such as helium, neon, argon, krypton and xenon are satisfactory for this purpose.

By having the copper activator present in a higher concentration than in previously known phosphors, applicants have produced a phosphor satisfactory for green emission in an electroluminescent cell. Lower concentrations of copper activator would not produce a zinc sulfide phosphor satisfactory for this use.

While the present invention has been described with reference to particular embodiments thereof, it will be understood that numerous modifications may be made by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. The method of preparing a copper-activated zinc sulfide phosphor having a green electroluminescent emission which comprises firing a mixture consisting of zinc sulfide, sufficient copper salt to provide about 0.3% by weight of copper and at least about 5% by weight of a flux selected from the group consisting of alkali chloride and alkali bromide at a temperature of approximately 1100° C. in an inert atmosphere.

2. The method of preparing a copper-activated zinc sulfide phosphor having a green electroluminescent emission which comprises firing a mixture consisting of zinc sulfide, sufficient copper salt to provide about 0.3% by weight of copper and at least 5% by weight of a flux selected from the group consisting of alkali chloride and alkali bromide at a temperature of approximately 1100° C. in an inert atmosphere, and removing excess copper by washing the phosphor in a cyanide solution.

3. A method of claim 2 wherein the flux is sodium chloride.

4. The method of preparing an electroluminescent copper-activated zinc sulfide phosphor having a green emission which comprises firing a mixture consisting of zinc sulfide, sufficient copper salt to provide about 0.3% by weight of copper and at least about 5% by weight of sodium chloride at a temperature of approximately 1100° C. in an inert atmosphere, and removing excess copper by washing the phosphor in a cyanide solution.

References Cited in the file of this patent

UNITED STATES PATENTS

| | | |
|---|---|---|
| 2,541,384 | Rothschild | Feb. 13, 1951 |
| 2,660,566 | Froelich | Nov. 24, 1953 |

OTHER REFERENCES

Kroger: Article in Physica 15, 1949, pp. 990–1018. Copy in Naval Research Laboratory.